Jan. 28, 1958 J. C. TRAVILLA 2,821,149
RAILWAY TRUCK AND BODY ASSEMBLY
Filed April 24, 1953 4 Sheets-Sheet 1

INVENTOR.
James C. Travilla
BY Rodney Bedell
Atty.

Jan. 28, 1958 J. C. TRAVILLA 2,821,149
RAILWAY TRUCK AND BODY ASSEMBLY
Filed April 24, 1953 4 Sheets-Sheet 2

INVENTOR.
James C. Travilla
BY Rodney Bedell
Atty.

Jan. 28, 1958     J. C. TRAVILLA     2,821,149
RAILWAY TRUCK AND BODY ASSEMBLY

Filed April 24, 1953     4 Sheets-Sheet 3

INVENTOR.
James C. Travilla
BY Rodney Bedell
Atty.

Jan. 28, 1958   J. C. TRAVILLA   2,821,149
RAILWAY TRUCK AND BODY ASSEMBLY
Filed April 24, 1953   4 Sheets-Sheet 4

INVENTOR.
James C. Travilla
BY Rodney Bedell
atty.

ered Jan. 28, 1958

United States Patent Office 2,821,149
Patented Jan. 28, 1958

2,821,149

RAILWAY TRUCK AND BODY ASSEMBLY

James C. Travilla, University City, Mo., assignor to General Steel Castings Corporation, Granite City, Ill., a corporation of Delaware Application April 24, 1953, Serial No. 350,810

15 Claims. (Cl. 105—196)

This invention relates to railway rolling stock and particularly to the assembly of a passenger vehicle body underframe with a supporting truck having a swivel connection to the body.

The invention is advantageously embodied in a truck having a long wheel base, such as a six wheel truck, which is usually provided with a center plate at the center of the truck, and the swinging of the ends of the truck about the center plate is limited by the approach of the wheels of the end wheel and axle assemblies to the draft sills or to draft gear mounting structure on the draft sills. The swinging of the ends of the truck may be further restricted where the truck is equipped with brakes of the type involving discs on each wheel and axle assembly and positioned inwardly from the wheels and projecting above the level of the bottom of the draft gear mounting structure.

One object of the invention is to avoid undesirable limitation upon the swinging of the truck about the swivel connection when the truck is equipped with disc type brakes.

In the usual six wheel truck for passenger vehicles, the entire truck load is supported through a single center plate at the longitudinal and transverse center of the truck and over the middle axle of the truck, the center plate being carried by a double bolster comprising spaced transverse members and a longitudinal member between them mounting the center plate. Such a truck includes side bearings on the truck frame limiting lateral tilting of the bolster. It has been proposed in locomotive motor driven trucks to support the locomotive body at three points on the truck, one point forming a swivel connection and the other two points being spaced apart transversely of the truck in either position on the truck frame or on the end portion of a double bolster, thus reducing the load on the pivotal support and avoiding the use of side bearings and making possible a lighter truck structure and locating the supports in the spaces between motors so as to keep the locomotive body a minimum height from the rail. Such previously used trucks, however, cannot use a disc brake and are not subject to disc brake clearance problems, and it is another object of the present invention to facilitate the use of disc brakes by providing a three point support of the body on a double bolster, which is spring supported outwardly of the truck frame.

One of the factors affecting the easy riding qualities of a passenger vehicle is the tendency of the truck to shimmy as a result of its wheels moving back and forth laterally of the track, as permitted by the clearance between the wheel flanges of the rails.

By using a three point support for the body on the truck and utilizing sliding friction bearings for the laterally spaced supports, and proportioning the load distributed to the central pivot bearing and to the laterally spaced bearings, any desired frictional resistance to the pivoting of the truck may be effected and it is another object of the present invention to avoid truck shimmy by proper proportioning of the load transmitted through the central bearing and the laterally spaced bearings.

In the accompanying drawings illustrating selected embodiments of the invention, Figure 1 is a top view of the end sill and center sill of a vehicle body mounted on a six wheel truck equipped with braking discs between the axles and showing in broken lines the position of the brake discs when the truck swivels from a normal position.

Figure 5 is a detail horizontal section taken on the line 5—5 of Figure 2.

Figure 1:
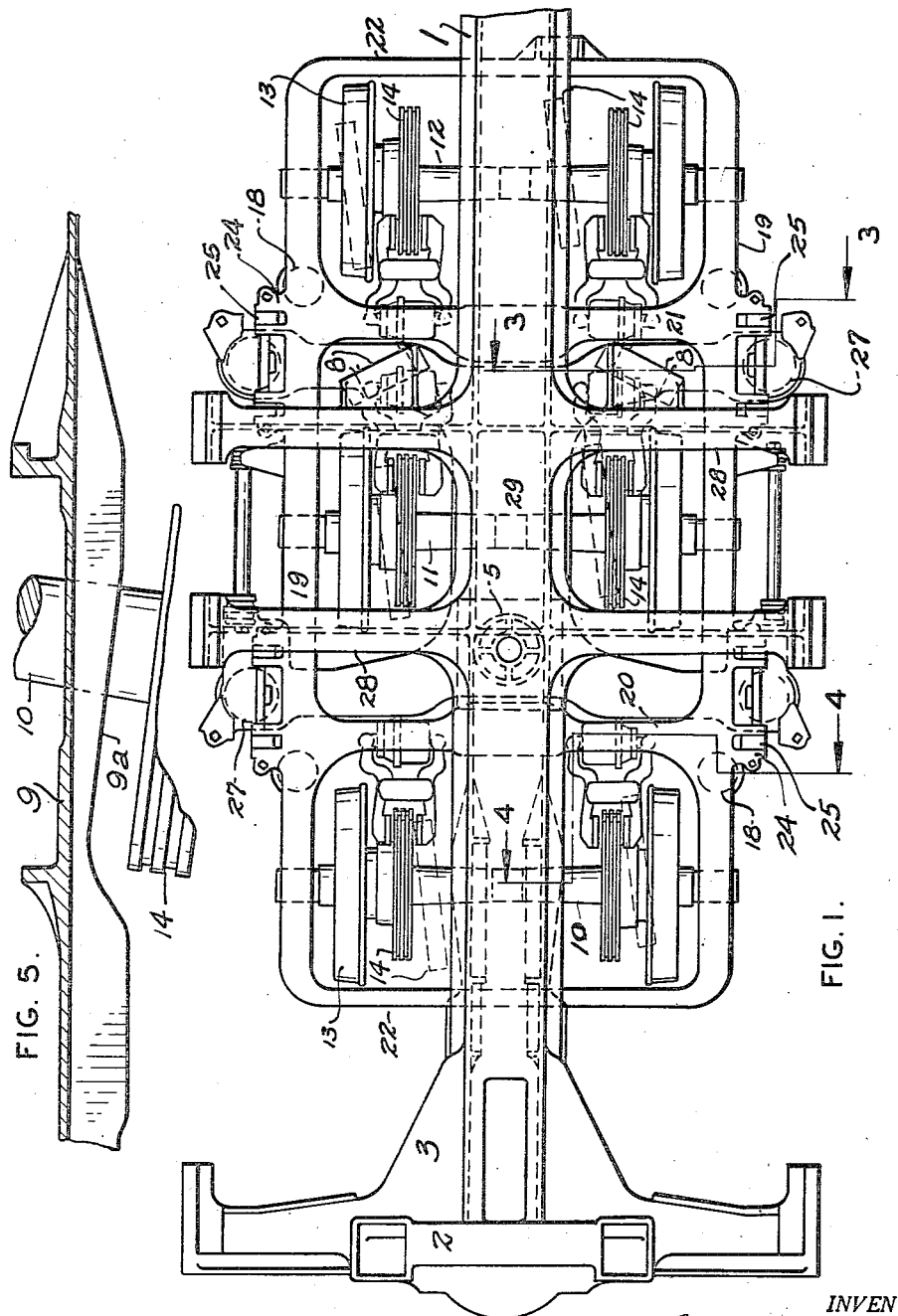
Figure 2:
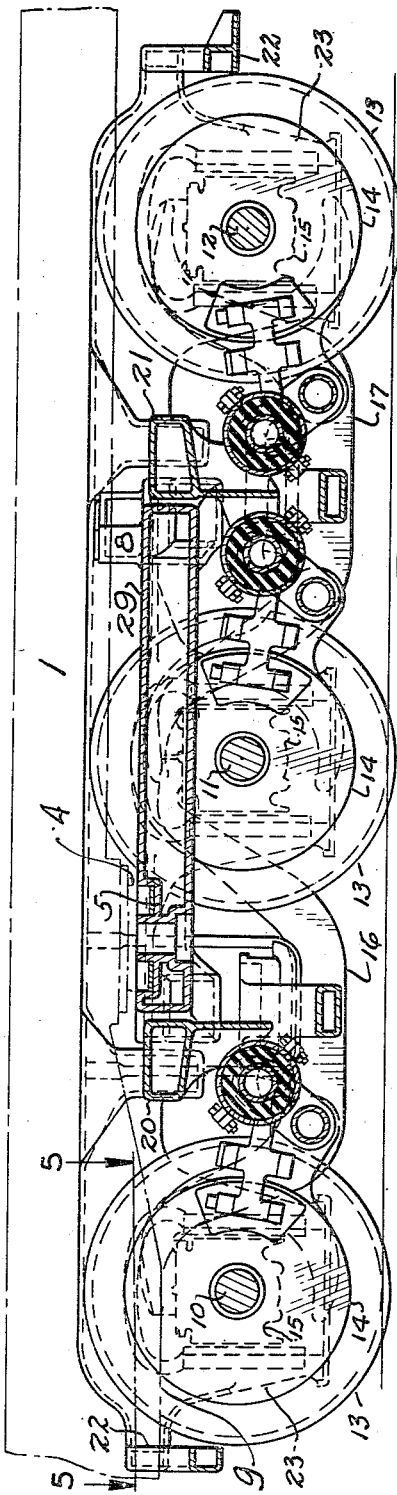
Figure 2 is a vertical section taken on the longitudinal center line of the truck with the vehicle body center sill and draft sill structure indicated in broken lines. The figure is drawn to a larger scale than Figure 1.
Figure 3:
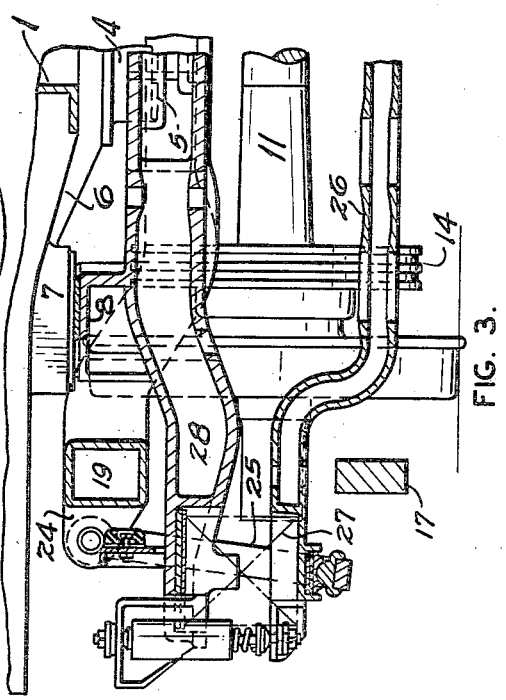
Figure 3 is a detail vertical cross section taken on the line 3—3 of Figure 1.

In the structure shown in Figures 1–5, the body underframe comprises center sill structure 1 of inverted U section and end sill structure 2 merging with the end of center sill structure 1 and also connected thereto by diagonal gusset plates 3. The under part of center sill 1 includes a center bearing 4 received in a corresponding center plate 5, on the truck bolster. The body underframe includes a bolster 6 having transversely spaced bearings 7 mounted upon cooperating bearings 8 on the truck bolster. The left hand end of the center sill structure is deepened at 9 to form draft sill structure for receiving any suitable draft gear (not shown).

The truck includes three axles 10, 11, 12, each mounting wheels 13 and provided with brake discs 14 positioned inwardly of the truck from the wheels. Journal boxes 15 are mounted upon the axle journals and carry drop equalizers 16, 17 which mount equalizer springs 18. A one piece truck frame is carried on springs 18 and comprises wheel pieces 19, transverse transoms 20, 21, end transoms 22, and depending pedestal jaws 23 arranged in pairs and receiving between them journal boxes 15.

Suspended from brackets 24 extending outboard from each frame wheel piece or side member 19 are two pairs of swing hangers 25, the lower ends of each pair supporting a spring plank 26. Springs 27 on spring planks 26 mount the truck bolster consisting of transverse members 28, extending beneath the truck frame side members, and a center bolster 29. The bolster structure 28, 29 forms a rigid unit carrying the center plate 5 and the transversely spaced bearings 8.

The three points of support of the vehicle body are below the level of the top of the frame side members and these low points of support, together with the wide spacing of the supports for the spring planks, increase the stability of the vehicle and reduce the tendency to overturn when the vehicle is traveling on curved track.

Center plate 5 is spaced longitudinally of the truck from the middle wheel and axle assembly and towards the adjacent end of the truck and substantially closer to end axle 10 than to end axle 12. Accordingly, when the truck and body swivel relative to each other, as shown by the broken line indication of the brake discs 14 in Figure 1, the discs 14 on axle 10 do not move transversely of the vehicle body underframe as great a distance as do the discs 14 on axles 12. The angular movement of the truck about center plate 5 may be greater, before the brake discs 14 on axle 10 engage the draft sill structure, than would be the case if the center plate were over middle axle 11.

Figure 4:
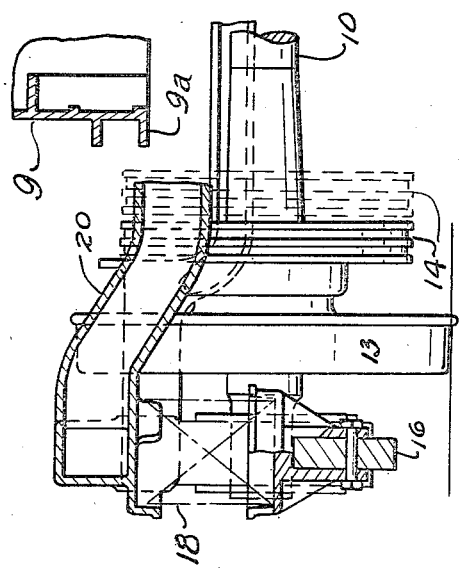
Figure 4 is a similar section taken on the line 4—4 of Figure 1.
Figure 6:
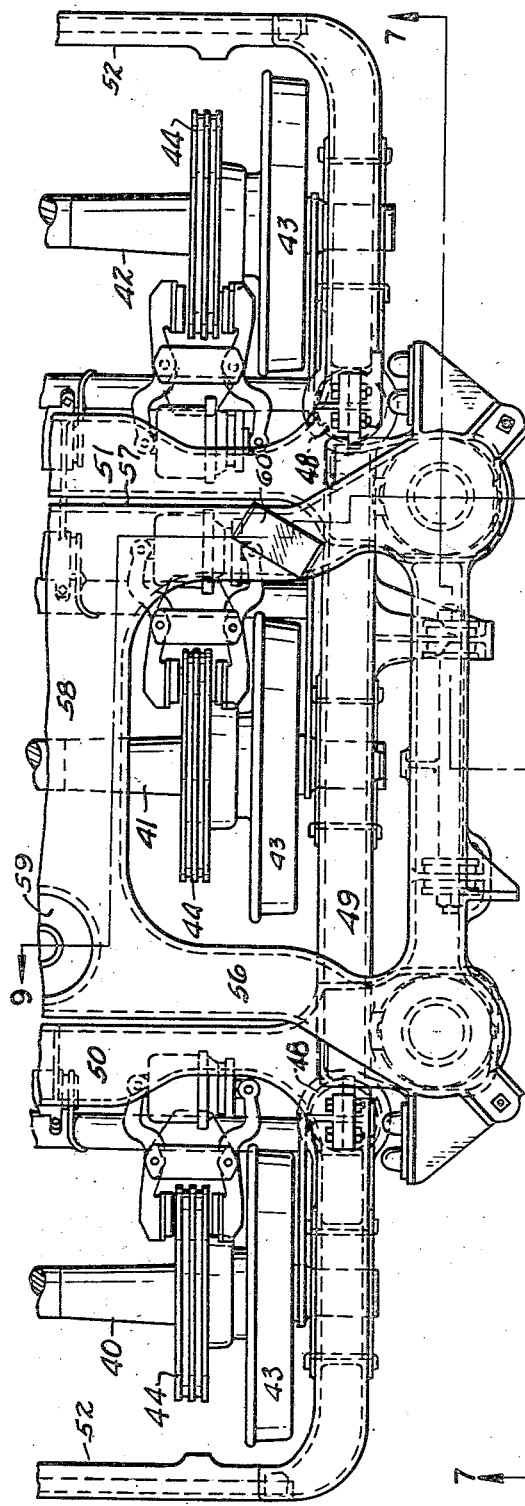
Figure 6 is a top view of one longitudinal half of a truck corresponding to that shown in Figure 1 but illustrating another embodiment of the invention.
Figure 7:
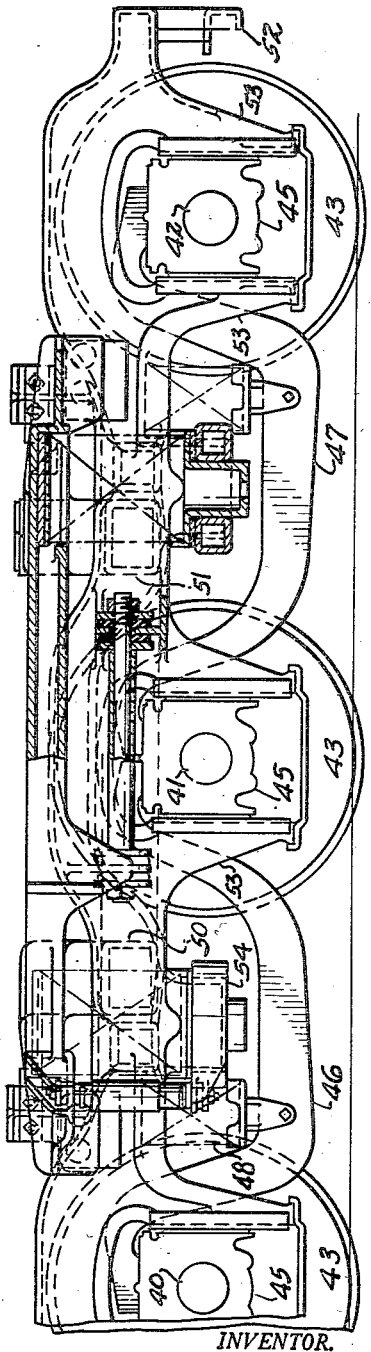
Figure 7 is a side elevation and vertical section taken on the line 7—7 of Figure 6.
Figure 8:
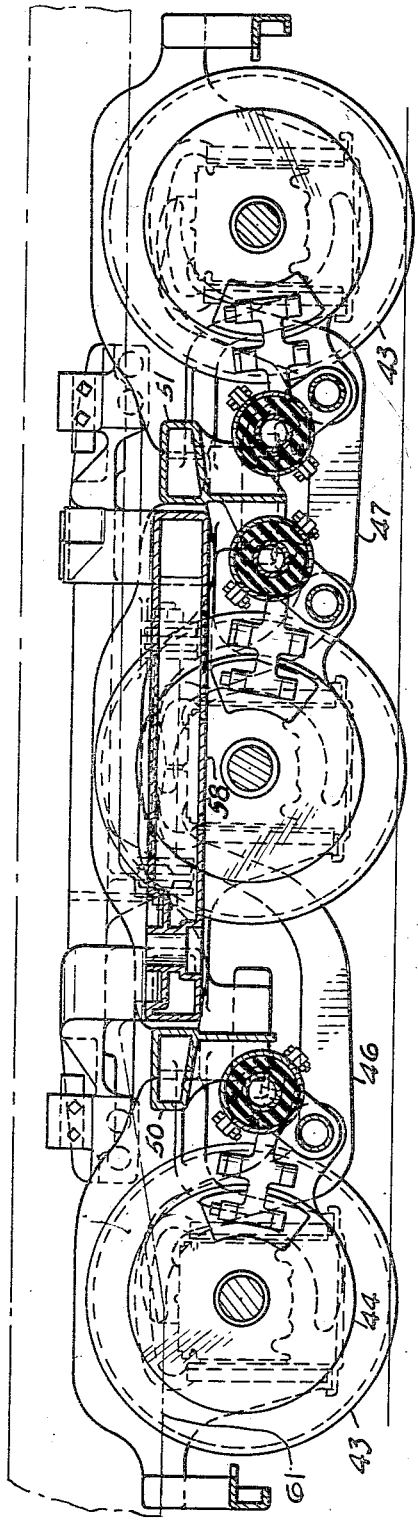
Figure 8 is a vertical section taken on the longitudinal center line of the truck shown in Figure 6 and indicating in broken lines a portion of the vehicle body underframe structure.
Figure 9:
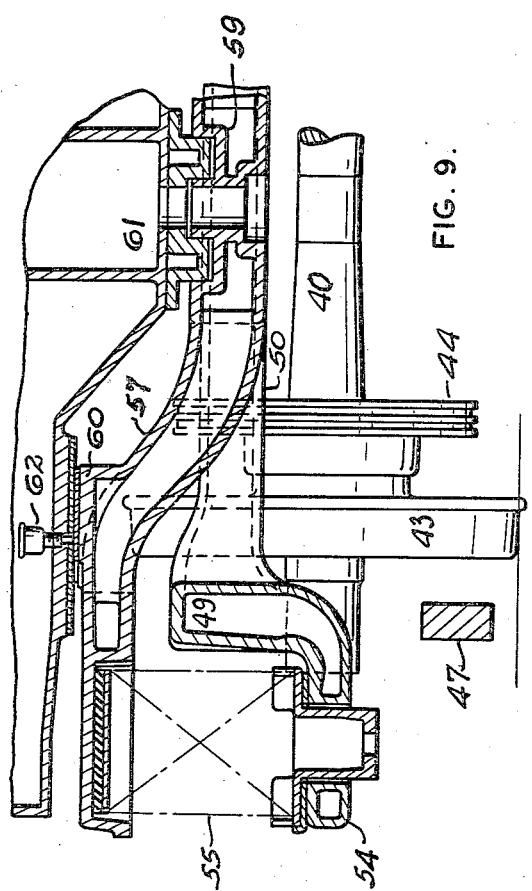
Figure 9 is a vertical transverse section taken on the line 9—9 of Figure 6.

The relation of the truck parts to each other as shown in Figure 1 is determined by the maximum curvature of track for which the vehicle is intended and the determination provides for the clearance shown in broken lines in Figure 4 when the vehicle is on such maximum curved track. The brake discs on axle 12 may swing a greater distance transversely of the underframe because the lower edge of center sill structure 1 is substantially higher than the lower edge of draft sill structure 9 and allows the brake disc to swing partly under the sill. The center sill structure would similarly accommodate the brake discs if it were deeper and narrower than as shown to provide greater clearance for the sides of the brake discs but the draft gear requires a definite width and depth of the draft sill structure.

Increased clearance for the transversely swinging brake discs 14 on axle 10 may be provided by recessing the lower flange 9a of the draft sill structure as indicated in Figure 5 without requiring the draft sill to be made more shallow.

The general arrangement described in connection with Figures 1–5 is also embodied in the structure shown in Figures 6–9, in which the swing hangers and spring plank arrangement are omitted and the bolster is supported more directly from the truck frame. In this arrangement, the axles 40, 41, 42, and wheels 43, brake discs 44, journal boxes 45, equalizers 46, 47, and equalizer springs 48 are substantially like those previously described. The truck frame includes wheel pieces or side members 49 and transverse transoms 50, 51, end transoms 52, and depending pedestal jaw 53.

Integral with wheel pieces 49 and projecting downwardly and outwardly of the truck therefrom are rigid brackets 54, there being a pair of such brackets at each side of the truck spaced apart longitudinally of the truck and positioned intermediate the middle wheel and axle assembly and the two end wheel and axle assemblies. Each bracket mounts a bolster spring 55 extending upwardly substantially above the level of the top of the truck frame side member and mounting the end portions of cross bolsters 56, 57 or connected by a center bolster 58. The bolster comprises a rigid unit having three points of support for the vehicle body, one point of support being a center plate 59 on the longitudinal center line of the truck and partially on the left hand cross bolster 56, and the other two points being transversely spaced bearings 60 on the elevated end portions of the right hand cross bolster 57.

While this structure does not provide for the degree of lateral movement of the bolster and vehicle body relative to the truck frame which is provided in the structure shown in Figures 1–5, the stability afforded by supporting the bolster outboard of the wheel and axle assemblies outwardly of the wheels and truck frame wheel pieces is retained. The swivel assembly of the truck and body underframe on center plate 59 near the left hand axle 40, which will be nearest the adjacent end of the truck frame and under the draft sill structure 61 will make possible the transverse swinging of the wheels and brake discs on axle 40 a less distance than if the center plate were over the middle axle 41 as is the usual arrangement, notwithstanding the lower level of the bottom of the draft gear-receiving sills 61.

With the three point support as shown and described the usual side bearings are eliminated and the two laterally spaced bearings which form part of the three point support may be so loaded and spaced from the pivot bearing that the desired amount of lateral resistance against swivel action is provided for safe travel on curves and for preventing shimmy of the truck on straight track.

The laterally spaced sliding bearings may be of the friction type illustrated but if it is desired that the lateral resistance of these supports be reduced, they may include rollers or rockers to eliminate the friction. If desired, the sliding bearings may be kept lubricated as indicated at 62, Figure 9.

Another advantage of the arrangement is that a truck bolster which has a three point load support can be made of lighter construction than one with a single load support over the middle axle as the longitudinal center member can be shallower and narrower. A shallower and narrower longitudinal center member makes it possible to lower the center plate a substantial amount and still have sufficient space above the disc brake associated with the middle axle so that the bracke is more accessible.

Other variations in the construction described may be made without departing from the spirit of the invention and the exclusive use of those modifications coming within the scope of the claims is contemplated.

What is claimed is:

1. In a railway vehicle, a body underframe including a center plate and a draft sill structure extending from the center plate towards the adjacent end of the underframe and including a draft gear-receiving portion projecting downwardly below the level of the bottom of the center plate structure, a body-supporting truck having a center plate connection to the body center plate and including a wheel and axle assembly between the center plate and the adjacent end of the vehicle and a wheel and axle assembly at the opposite side of the center plate from said first-mentioned assembly, there being circular braking discs mounted on each of said assemblies between its wheels and said draft sill structure and extending above the level of the bottom of said draft gear-receiving portion, the braking discs on the first-mentioned assembly being directly abreast of said draft gear-receiving portion, said second-mentioned assembly being spaced a substantially greater distance from the center plate than the first-mentioned assembly, whereby rail-induced pivotal movement of the truck and the body underframe swings the brake discs on the first-mentioned assembly a less distance towards the longitudinal center line of the vehicle than the brake discs on the second-mentioned assembly.

2. A railway vehicle as described in claim 1 which includes opposed bearing members on the body underframe and truck respectively spaced from each other transversely of the truck and positioned nearer to the second-mentioned wheel and axle assembly than to the first-mentioned wheel and axle assembly, the truck load being transmitted to the truck through the center plates and through each of the transversely spaced bearings.

3. In a railway vehicle, a truck including wheel and axle assemblies and a load-carrying member supported thereby, a body underframe having a swivel connection to said truck member, said underframe including a center sill structure having a portion extending from said swivel connection over the axle of at least one of said assemblies and towards the middle of the underframe, the underframe including a draft sill structure extending from said swivel connection over the axle of another of said assemblies and towards the adjacent end of the underframe, said draft sill structure including a draft gear-receiving portion projecting downwardly below the level of said center sill structure portion, each of said assemblies including brake discs between its wheels and draft sill structure and projecting above the level of the bottom of said draft gear-receiving portion, the brake disc of the axle nearest the end of the underframe being transversely opposite to the deepest part of said draft sill structure, said swivel connection being nearer to the latter-mentioned assembly than to the other assembly, whereby the relative lateral movement of the draft sill structure and the adjacent brake discs, when the vehicle is on curved track, is less than if the swivel connection were equidistant from said assemblies.

4. In a railway vehicle, a truck including three wheel and axle assemblies and a load-carrying member supported thereby, a body underframe having a swivel connection to said truck member positioned between the middle assembly and one of the end assemblies, the underframe including a draft sill structure extending from said swivel connection over the axle of said end assembly, the underframe including a center sill structure having a portion extending from said swivel connection over the axle of the middle assembly and the axle of the other end assembly, said draft sill structure having a draft gear-receiving portion projecting downwardly below the level of said center sill portion and directly over said first-mentioned end assembly, and said first-mentioned end assembly having brake discs between its wheels and extending above the level of the bottom of said draft gear-receiving portion.

5. A railway vehicle as described in claim 4 which includes opposed bearing members on the body and truck respectively spaced from each other transversely of the truck and being positioned between the middle wheel and axle assembly and the other end wheel and axle assembly, a substantial part of the body load on the truck being carried through the center plates and another substantial portion of the body load on the truck is carried by said bearings.

6. In a railway vehicle truck, wheel and axle assemblies, a truck frame supported therefrom and including side members positioned outboard of the wheels, spring seats supported from said frame and positioned outwardly of said side members, springs on said seats, a bolster mounted on said springs and extending transversely of the truck beneath said frame side members and providing three points of support for a vehicle body, one point being on the longitudinal center line of the truck and forming a swivel bearing for the body and the other two points being spaced apart transversely of the truck.

7. A railway vehicle truck as described in claim 6 in which the body support points are below the level of the top of the truck frame side members.

8. In a railway vehicle truck, wheel and axle assemblies, a truck frame supported therefrom and including side members positioned outboard of the wheels, spring seats supported from said frame and positioned outwardly of said side members, springs on said seats, a bolster extending transversely of the truck and above the truck frame side members and supported on said springs outboard of said side members and providing three points of support for a vehicle body, one point being on the longitudinal center line of the truck and forming a swivel bearing for the body and the other two points being spaced apart transversely of the truck.

9. A railway vehicle truck as described in claim 8 in which the transversely spaced body support points are above the level of the top of the truck frame side members.

10. In a railway vehicle truck, wheel and axle assemblies, a truck frame supported therefrom and including side members positioned outboard of the wheels, hangers suspended from said frame at points outboard of said side members to swing transversely of the truck, springs supported from said swing hangers and positioned outwardly of the frame side members, a bolster mounted on said springs and providing three points of support for a vehicle body, one point being on the longitudinal center line of the truck and forming a swivel bearing for the body and the other two points being spaced apart transversely of the truck.

11. A railway vehicle truck as described in claim 10 in which the bolster extends transversely of the truck beneath the frame side members.

12. In a railway vehicle truck, wheel and axle assemblies, a truck frame supported therefrom and including side members positioned outboard of the wheels, said frame including brackets extending from said side members outwardly of the truck, springs seated on said brackets, and a bolster mounted on said springs and extending transversely of the truck over the frame side members and providing three points of support for a vehicle body, one point being on the longitudinal center line of the truck and forming a swivel bearing for the body and the other two points being spaced apart transversely of the truck.

13. A railway vehicle truck according to claim 12, in which those portions of the bolster providing the transversely spaced points of support for a vehicle body are above the level of the truck frame side members.

14. A railway vehicle truck according to claim 12, in which those portions of the bolster providing the transversely spaced points of support for a vehicle body are above the level of the truck frame side members and that portion of the bolster providing the vehicle body support on the longitudinal center line of the truck is at a substantially lower level.

15. In a railway vehicle truck, wheel and axle assemblies, a truck frame supported therefrom and including side members positioned outboard of the wheels, spring seats supported from said frame and positioned outwardly of said side members, springs on said seats, a bolster extending transversely of the truck beyond said side members and mounted on said springs and providing three points of normal support for a vehicle body, one point being on the longitudinal center line of the truck and forming a swivel bearing for the body and the other two points being positioned inboard of the frame side members but spaced apart transversely of the truck and spaced from the swivel bearing longitudinally of the truck, one of the wheel and the axle assemblies and the swivel bearing being nearer to one end of the truck than they are to the other end of the truck, said wheel and axle assembly being provided with circular brake discs between the wheels.

References Cited in the file of this patent

UNITED STATES PATENTS

| Number | Name | Date |
|---|---|---|
| 975,303 | Vauclain | Nov. 8, 1910 |
| 1,097,800 | Hamilton | May 26, 1914 |
| 1,467,682 | Pflager | Sept. 11, 1923 |
| 1,498,046 | Larsen | June 17, 1924 |
| 1,776,079 | Morch et al. | Sept. 16, 1930 |
| 1,895,500 | Todd | Jan. 31, 1933 |
| 2,252,382 | Lanning | Aug. 12, 1941 |
| 2,469,513 | Nystrom et al. | May 10, 1949 |
| 2,632,405 | Ivatt | Mar. 24, 1953 |
| 2,636,450 | Eksergian | Apr. 28, 1953 |
| 2,705,924 | Travilla et al. | Apr. 12, 1955 |